Feb. 20, 1968     C. O. KREUTZER     3,369,318

ELECTROFISHING FENCE, BOTTOM CABLE TYPE

Filed Aug. 20, 1965     3 Sheets-Sheet 1

INVENTOR.
CONRADIN O. KREUTZER

BY Arthur Robert

ATTORNEY

United States Patent Office 3,369,318
Patented Feb. 20, 1968

3,369,318
ELECTROFISHING FENCE, BOTTOM CABLE TYPE
Conradin O. Kreutzer, Lewes, Del., assignor to Smith Research and Development Company, Inc., Lewes, Del., a corporation of Delaware
Filed Aug. 20, 1965, Ser. No. 481,207
4 Claims. (Cl. 43—17.1)

This invention relates to an improved means for establishing an electrical fence, extending not only transversely through the fishing waters but also across a longitudinal path along which the fish swim, so as to intercept said fish for one purpose or another. While this invention may be used to intercept various types and varieties of fish in various waters, for the sake of clarity, the explanation of this invention will be largely confined to the interception of menhaden fish in the fishing waters over a continental shelf, such as the one extending longitudinally along the east coast of the United States.

An important object of the present invention is to extend an electrical fence horizontally and vertically across a continental shelf so as to intercept fish swimming along the shelf, thus making it possible to confine commercial purse seining operations to the shelf waters on the fish-congregating side of the electrical fence. The advantages of this procedure are obvious.

It has heretofore been proposed to extend electrical barriers or fences horizontally and vertically across a fishing stream so as to intercept fish swimming along the stream. The use of these barriers has been confined to relatively small operations requiring installations of a size measured in feet. From a practical standpoint, the use of fish intercepting barriers large enough to be measured in miles has heretofore been out of the question although it has been proposed, in one case, to traverse the bottom of the fishing waters over a distance of one mile more or less with an elongate submergible insulated cable, feed AC current intermittently through one conductor centered in the cable from a shore-grounded generator at one end of the cable to each of a succession of stations spaced at 30 foot intervals along the length of the cable and connect the single conductor of the cable directly to the sea water at each station through a high resistance break in the cable.

Practically speaking, said proposed fish intercepting barrier of the bottom-traversing cable type is not suited for effective use in electrically fencing any part of the Continental Shelf along the east coast of the United States. Here the shelf extends transversely from the shore line for a minimum of about 5 to 6 miles eastward with its minimum depth progressively increasing more or less from about 3 to 4 fathoms at two miles out to about 6 to 7 fathoms at four miles out.

The bulk of commercial menhaden purse seine fishing operations, probably as much as 70 to 90%, takes place over the mid-portion of the Continental Shelf, where the depth ranges from 4 to 6 fathoms or 24 to 36 feet. As the fishing waters get progressively warmer during the spring and summer, schools of menhaden universally swim northward through the Continental Shelf waters at a slow rate, say 2.5 miles per hour more or less. My invention takes advantage of the fact that, if these fish are intercepted, they may maneuver in an ampt to get around the interception but, normally, they should not swim southward until a seasonal change causes the fishing waters toward the south to get progressively colder.

Another important object of my invetnion is to provide a simple yet highly practical means for establishing an electrical fence extending horizontally for several miles and vertically up to 50 ft. and possibly more. An electrical fence of this character obviously could extend completely across the midportion of the Continental Shelf where the bulk of present day commercial purse seining operations take place.

In its presently preferred form, my invention may be carried out by performing the following steps, viz: (1) traversing the bottom of the fishing waters with an elongate submergible cable containing supply and return conductors, preferably coaxial; (2) feeding high voltage spaced pulse current through the cable from one end thereof to each of a succession of stations spaced along its length; (3) transforming this high voltage current at each station into low voltage spaced AC pulse current; and (4) feeding the low voltage AC current into an inter-station circuit having (a) a solid metal leg extending horizontally on the bottom of said fishing waters from said one station to said adjacent station, and (b) a water leg extending horizontally from said one station to said adjacent station and vertically from the bottom of said fishing waters upward to a predetermined extent, perferably the surface of the water, said water leg being of somewhat cylindrical cross-section centered on said solid leg.

The water leg, which necessarily is somewhat cylindrical (or semi-cylindrical) in cross-section, is centered on the solid metal leg; hence the contour of the solid leg establishes the horiozntal contour of the water leg and therefore the horizontal contour of the electrical fence formed by the water leg. In the preferred form of my invention, this horizontal contour is of zigzag shape so as to form one or more pockets on the south side of the fence for north bound fish and one or more pockets on the north side of the fence for south bound fish.

My invention is illustrated in the accompanying drawings wherein.

Figure 4:
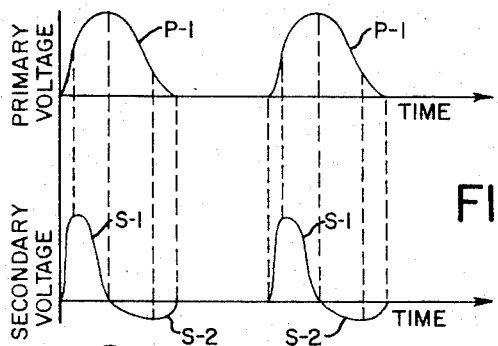
Figure 3:
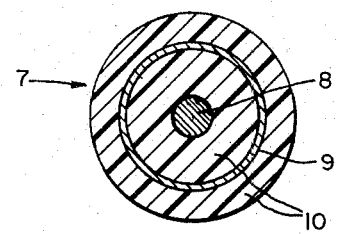
FIG. 3 is a section through the cable.
Figure 5:
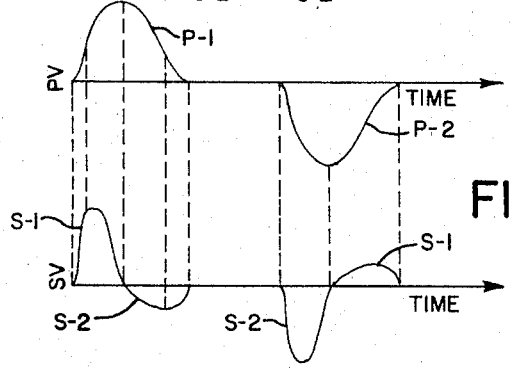
Figure 6:
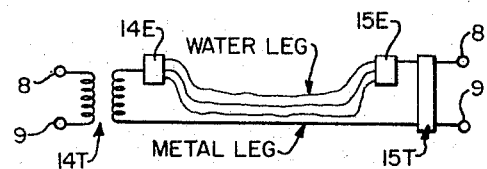
Figure 7:
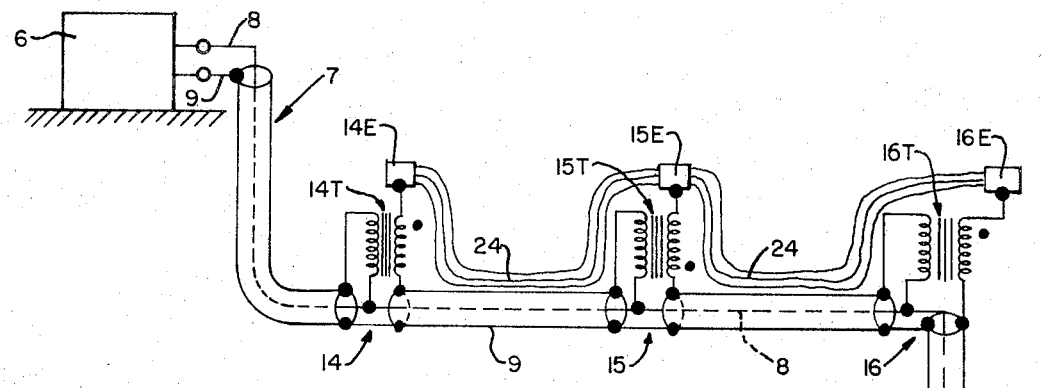
Figure 8:
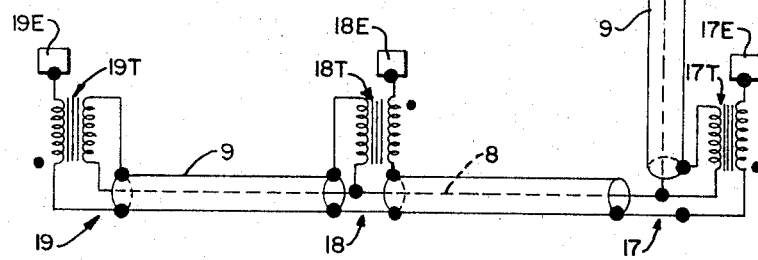
Figure 8:
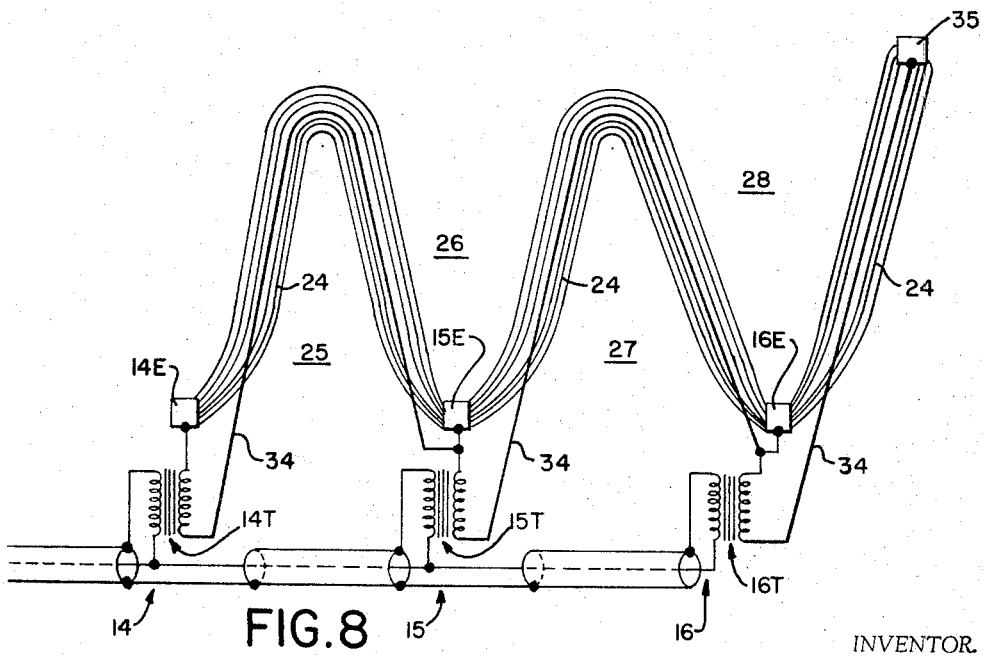
Figure 9:
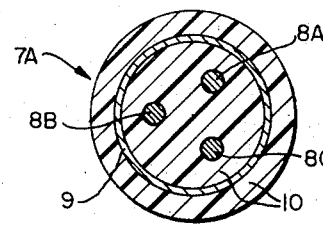
Figure 10:
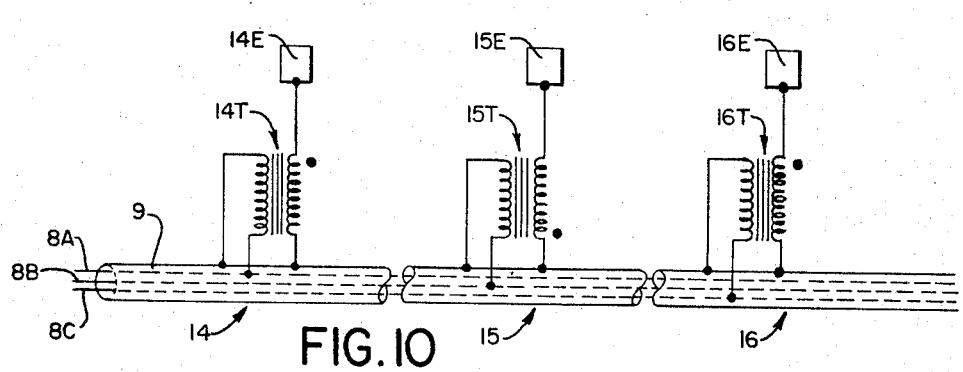

FIGS. 4–5 show the nature of the high-voltage spaced pulse current fed by the pulse generator through the cable to the transformer primary and the time-phase relationship of that high primary voltage (PV) pulse current to the corresponding low secondary voltage (SV) spaced AC pulse current, which is induced in the transformer secondary, the primary current being composed of spaced primary pulses of one polarity in FIG. 4 and of spaced primary pulses of opposite polarity in FIG. 5;

FIG. 6 is a diagram of the circuit between two stations;

FIGS. 7 and 8 are schematic views of two specific arrangements of cable, transformers and electrodes;

FIGS. 9–10 show a modification of the FIG. 7 arrangement; and

Figure 11:
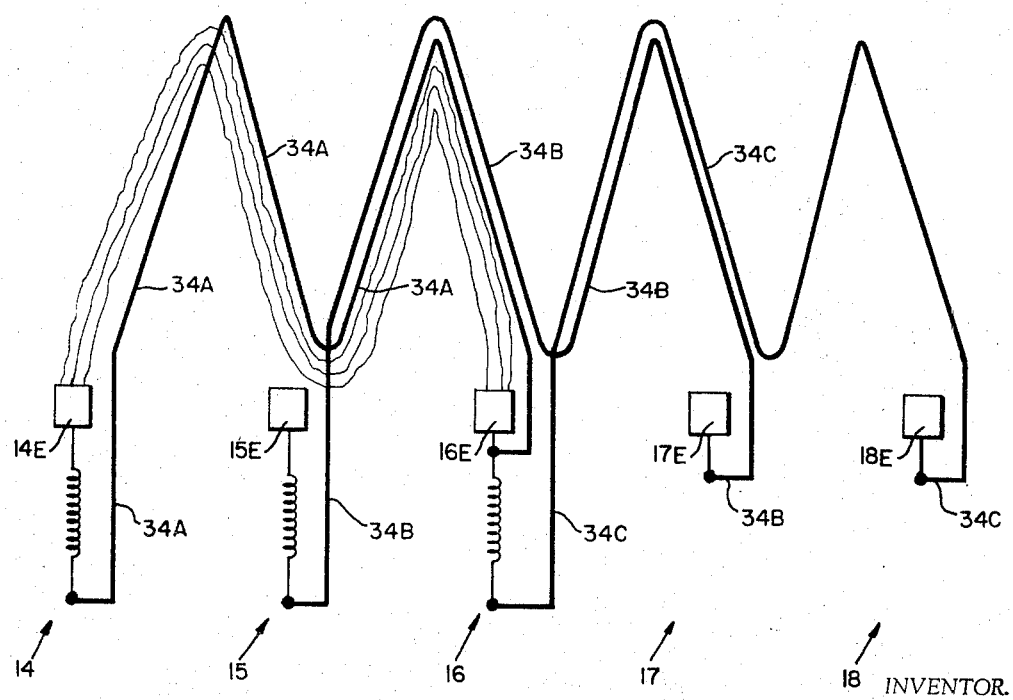

FIG. 11 shows a modification of the FIG. 8 arrangement.

FIGS. 1-6

Figure 1:
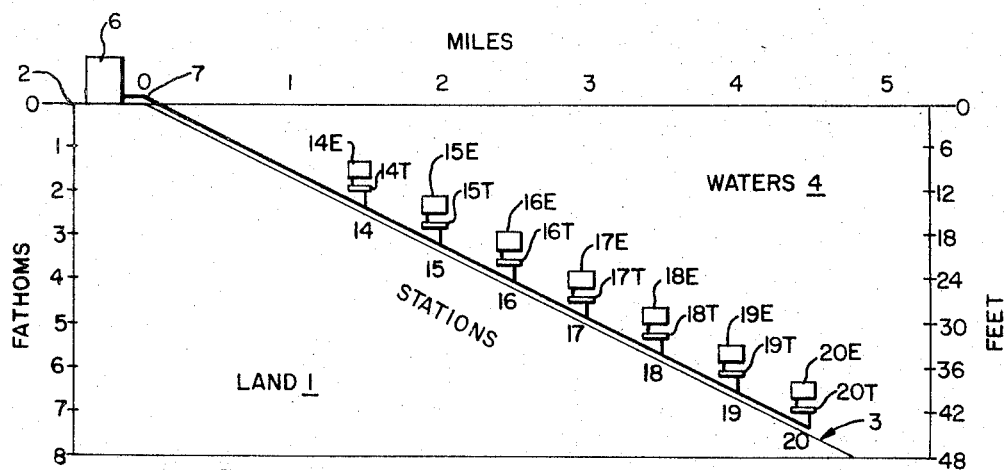
FIG. 1 is a somewhat schematic vertical sectional view of a fish intercepting barrier of the bottom traversing cable type.
Figure 2:
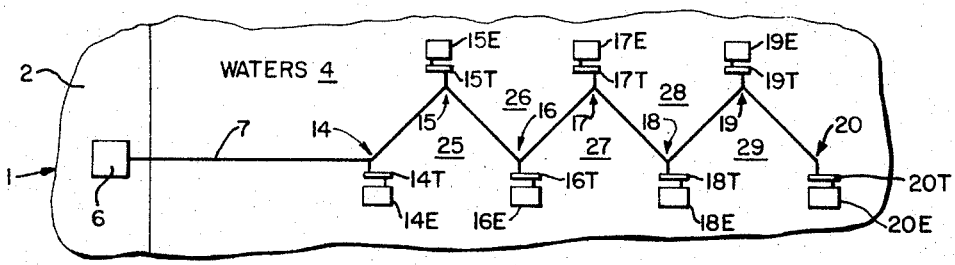
FIG. 2 is a schematic top plan view of the installation shown in FIG. 1.

In FIGS. 1–2, a portion of a continental shelf is shown wherein a land mass 1 provides a shore 2 and a bottom 3 for the continental shelf fishing waters 4. The bottom 3 slopes from zero depth at the shoreline to 18 feet two miles out and approximately 40 feet four miles out.

A shore based pulse generator 6 generates a high-voltage spaced pulse current of suitable character, the primary voltage (PV) pulse shown either at P–1 in FIG. 4 or at P–1 and P–2 in FIG. 5. This current is fed into one end of an elongate submerged insulated cable 7 containing appropriate power (supply and return) line conductors 8 and 9, preferably coaxial, and insulating means 10 for insulating them from each other and from their ambient environment such as the bottom 3 and water 4.

The use of a co-axial cable appears always to be desirable. It may be necessary at the smaller voltages where inductivity becomes a factor. However, it is not necessary where the voltage is large and inductance is not a large factor but, in such case, the conductors 8 and 9 should be close together.

The cable 7 has a succession of stations spaced along its length beginning with station 14 which is indicated as being 1½ miles from shore, continuing through successive stations 15–19 at ½ mile intervals and ending with station 20 4½ miles from shore. There is a corresponding succession of transformers and electrodes beginning with transformer 14T and electrode 14E at station 14 and ending with transformer 20T and electrode 20E at station 20.

Each of the transformers 14T to 20T is of a type, which transforms high-voltage spaced pulse current, whether DC (P–1) or AC (P–1 and P–2), into low-voltage spaced AC pulse current composed of S–1 and S–2 pulses as seen in FIGS. 4 and 5. For each transformer, there is a primary circuit means at the same station and a secondary circuit means extending from that same station to an adjacent station.

Each primary circuit means electrically connects the high-voltage primary winding of its transformer across the adjacent high-voltage power supply and return lines 8 and 9.

Each secondary circuit means provides an interstation circuit composed of a metal leg in series with a water leg, each leg extending from one station to the next. For example, the interstation circuit for stations 14 and 15 has (a) a metal leg extending from electrode 14E through the secondary of transformer 14T, thence through a metal conductor extending from station 14 to station 15 where it terminates at electrode 15E and (b) a water leg extending from electrode 15E through the fishing waters 4 directly to electrode 14E.

It will be understood that the station 14 portion of the metal leg includes the secondary of transformer 14T while the station 15 portion of that metal leg may or may not include the secondary of transformer 15T.

The interstation portion of that metal leg may, for example, be provided by the power line conductor 9 or an independent line. It extends from one station horizontally to the other on or along the bottom 3 of the fishing waters 4. While it may have any suitable horizontal contour, it is illustrated as extending from one station to the other in a zigzag manner in order that the electrical fence established by the water leg 24 will also extend in a zigzag manner and thereby provide pockets as illustrated. In FIG. 2, the illustrated pockets are designated 25–29. The pockets 25, 27 and 29 on one side of the fence are assumed to open southward; hence the pockets 26 and 28, on the opposite side of that fence, open northward.

In operation, the generator 6 sends pulses through cable 7 at a suitable pulse rate which may range from 1 to 10 pulses per second. The peak voltage of these pulses is largely a matter of choice. It should be high and it may, for example, range up to 100,000 volts or more. With presently available equipment, primary pulses having a peak voltage of 40,000 are readily attainable and highly practical. At each station, the peak voltage will be stepped down to some suitable value, the magnitude of which depends on various considerations. A suitable secondary pulse voltage must be high enough to provide whatever voltage drop per foot is required. For example, menhaden fish 1 foot long are stunned when subjected to a drop of 3 volts per foot; hence, when adjacent stations (say 14 and 15) are spaced 2600 feet apart, the voltage drop across the water leg which connects their electrodes (14E and 15E) must approximate 7,800 volts for stunning purposes. For smaller fish a high voltage drop will be necessary over the same station spacing for stunning menhaden while a smaller voltage drop can be used for larger fish.

In connection with the foregoing arrangement, we note: that 2600 feet equals 800 meters; that, in addition to the water leg voltage drop between electrodes, there is an additional voltage drop on each electrode due to a resistance which we may assume equals a total of .05 ohm for both electrodes; that, if we assume a secondary current of 10,000 amperes, the additional electrode voltage drop (resulting from the electrode resistance of .05 ohm) totals 500 volts so that the secondary voltage must be at least 8300; that, with a primary voltage of 40,000 volts, the step-down ratio must approximate 4.8 plus to deliver a secondary voltage of 8300; and that, with a water leg voltage of 7800 volts and current of 10,000 amps, the total resistance over the 800 meter long water leg equals .78 ohm or 780 milliohms which, in turn, reduces to .975 milliohm for each of the 800 meters.

A cylinder of sea water, having a length of 1 meter and an area of 1 square meter, has a resistance approximating 300 milliohms. This reduces to .975 milliohm when the area is increased from 1 square meter to 308 square meters. On this basis, a cylinder of sea water having a length of 1 meter and a cross-sectional area of 308 square meters has a radius of 9.9 meters or 34 plus feet. Over this reach, the electrical field should stun; hence it will repel at a much greater distance. Since the repelling reach is much greater than 34 feet, the electrical fence should be effective over its length and breadth which begins at station 14 1½ miles from shore where the depth is not less than 12 feet and which ends at station 20 4½ miles from shore where the depth approximates 45 feet.

Assuming that the electrical fence operates effectively (throughout its station-to-station length) from the bottom 3 upwardly to the surface of the fishing waters 4, it follows that menhaden fish swimming northward will be repelled by the zigzag electrical field. When repelled, they will not swim southward. Some of them may swim laterally in each direction and ultimately get around the ends of the electrical fence. But a very substantial percentage of the menhaden may be expected to congregate on the south side of the fence within the pockets and along the mouths of the pockets where they can be readily captured by conventional purse seining methods and quickly pumped into the hold of commercial fishing boats by means of the recovery method disclosed in my U.S. Patent #3,061,966. As a consequence, the practice of my invention may render it unnecessary for these commercial fishing vessels to search the fishing waters over wide areas for schools of fish and permit such vessels to wait for the fish to come to the fence.

FIG. 7

In the arrangement of FIG. 7 the pulse generator 6 supplies power to the center and sheath line conductors 8 and 9 which extend continuously through the cable from one end to the other. At each station, the transformer primary is connected across the line while the transformer secondary is connected between the sheath line 9 and the electrode.

With the FIG. 7 arrangement, the secondary of every other transformer is reversed so as to add its pulse voltage to that of the preceding secondary. Reversal is indicated in FIG. 7 by the location of the black dot associated with one end or the other of each transformer secondary to indicate that such ends are of the same electrical polarity at the same time. Thus, the black dot is located at the electrode end of the transformer secondaries of the stations designated by even numbers and at the opposite end of the other or "odd" numbered stations. For example, a given supply power pulse will energize all transformer primaries simultaneously and thus simultaneously produce an induced pulse in all transformer secondaries. If, at a given moment, an induced pulse in the secondary of transformer 14 renders electrode 14E electrically positive, then (at the same moment due to the reversal of transformer 15T), that same pulse will render electrode 15E electrically negative. Consequently, the voltage, between electrodes 14E and 15E, will be equal to the sum of the secondary voltages of transformers 14 and 15. In other words, if the transformer primary voltage is stepped down to a secondary voltage of, say 1500 volts, then, since the secondary voltages of transformers 14T and 15T are in the same direction at the same time, the voltage drop across the water leg from 14E to 15E will be 3000 volts.

Again, the current, flowing through the interstation circuit from stations 14 and 15, will flow from the secondary of transformer 14T successively through electrode 14E, the adjacent water leg 24, the electrode 15E, the secondary of transformer 15T and the power line 9 back to the secondary of transformer 14T. Similarly, the interstation circuit current for stations 15–16 will, at the same time, flow in a direction proceeding from electrode 15E through the secondary of transformer 15T, power line 9, the secondary of transformer 16T, electrode 16E and the water leg 24 back to electrode 15E.

FIG. 8

The arrangement of FIG. 8 differs from that shown in FIG. 7 because well-insulated independent line wires 34 are used to provide the interstation portion of the metal leg of each interstation circuit. In this arrangement, we assume that only three stations 14–16 are connected across the power supply line 8–9 as before. The secondary of transformer 14T is connected at one end to electrode 14E and at its opposite end to the (station 14) end of an insulated independent interstation line wire 34. The other (station 15) end of interstation line 34 is connected to the electrode 15E and one end of the secondary of transformer 15T. As a consequence, the interstation circuit for stations 14 and 15 extends serially through the insulated metal leg and the water leg wherein the metal leg embraces electrode 14E, the secondary of transformer 14T, independent interstation line wire 34 and electrode 15E while the water leg 24 embraces the fishing waters between electrodes 15E and 14E.

At the last station 16, the secondary of transformer 16T is connected to a shorter length of independent line wire 34 which terminates in an additional electrode 35 in order to provide another pocket. With this arrangement, the insulated power line cable itself may extend in a straight line because the electrical fence is centered on the insulated independent line wires 34 which are arranged in zigzag form to provide pockets 25 through 28 wherein pockets 25 and 27 are again assumed to open southward and 26 and 28 northward.

FIGS. 9–10

These figures illustrate a modification of the FIG. 7 arrangement. In this modification, three power supply lines 8A, 8B and 8C are provided in combination with return conductor 9 preferably arranged to form a coaxial cable. In this case, the primary of transformer 14T at station 14 is connected across the power lines 8A and 9 while the primaries of transformers 15T and 16T at stations 15 and 16 are respectively connected across power lines 8B and 9 and 8C and 9. It will be understood, of course, that one or more additional stations may be provided and that the power supply to additional stations will follow the pattern used in supplying power to stations 14–16. Thus, the first additional station will have its primary connected across 8A and 9, the next across 8B and 9 and the next across 8C and 9.

This arrangement has a disadvantage in that it requires a more expensively constructed power supply cable 7A. It has a number of advantages in that it permits the use of a higher pulse generating frequency and the use of smaller condensers.

FIG. 11

In the arrangement shown in FIG. 11, the insulated independent interstation line 34A leading out from station 14 turns back toward station 15 to provide a pocket but is not electrically connected at station 15. Instead it forms another pocket between stations 15 and 16 and is electrically connected at station 16. The insulated independent interstation line 34B leading out from station 15 is similarly arranged with respect to station 16 and similarly connected at "station" 17 to electrode 17E. The same pattern can, of course, be followed with additional stations. Assuming the last transformer station is 16, the system may be completed as in FIG. 8 or by extending an independent interstation line 34C out from station 16 and directing it in zigzag fashion first to "station" 17 and thence to "station" 18 where it is connected to electrode 18E. This FIG. 11 arrangement has the advantage of doubling the current density in certain water legs, such as those between stations 15–16 and 16–17. Obviously, the current density in certain water legs can be tripled by having the interstation circuit skip two (2) intervening stations instead of one as in FIG. 11.

MISCELLANEOUS

In carrying out the present invention, the pulses used in each water leg should have a high AC component, the higher the better. Conversely, and DC component should be low, the lower the better. The AC component of the current in the water leg should follow the path established by the metal leg. On the other hand, the DC component may be expected to travel in a straight line going from one electrode at one station to another electrode at the other end of the interstation circuit.

If, for any reason, the DC component is higher than one would normally otherwise desire, any pocket-forming fence arrangement employed should provide a station at each end of each straight section of the metal leg of the interstation circuit as in FIG. 2. In such a case, FIG. 7 would have stations 14 and 15 as indicated but, at the apex of the pocket between sections 14 and 15, an interposed station would be provided and arranged to cooperate with station 14 in providing one interstation circuit and with station 15 providing another interstation circuit.

It will be appreciated that the present invention may be employed to bar fish from swimming into areas where they are not wanted. Also the electrical fence need not be effective from the bottom all the way to the surface of the fishing waters in all cases. Thus, for example, some fish voluntarily confine their swimming to a strata of water having a top limit spaced substantially below the surface of the water. For these fish, an electrofishing fence extending horizontally along the bottom cable and vertically therefrom up to and preferably somewhat beyond said upper limit should normally be sufficient to intercept the fish.

It will be appreciated: that FIGS. 4 and 5 do not show the size-relationship between the amplitudes of the primary and secondary voltage pulses; that conductor 9 is continuous rather than broken as shown in FIGS. 7–8 and 10; that a water leg 24 extends between all paired stations although FIG. 7 shows only two water legs, one between each of two pairs of stations; and that the primary circuit means and cable shown in FIG. 8 are used in a circuit system of the type shown in FIG. 11 but omitted from the FIG. 11 illustration thereof.

Having described my invention, I claim:

1. An electrofishing fence of the bottom cable type for electrically fencing fishing waters, such as the waters over a continental shelf wherein during one season fish swim in one longitudinal direction generally parallel to the shore, so as to intercept said fish along a transverse band, corresponding to one extending transversely across and upwardly from the bottom provided by said shelf, comprising:

(A) An elongate submergible cable for traversing said bottom and for supplying high-voltage, spaced, pulse current from one end of the cable to each of a succession of stations spaced along its length, (1) said cable being composed of
  (a) at least two elongate power supply line conductors and
  (b) means electrically insulating said conductors from each other and from the ambient environment;
(B) a corresponding succession of transformers, primary circuit means, and electrodes, one each for each cable station,
  (1) each transformer being of a primary-secondary winding type, which transforms high-voltage, spaced, pulse current into low-voltage, spaced, AC pulse current, and
  (2) each primary circuit means electrically connecting the high-voltage primary of the corresponding transformer across said high-voltage power supply line at the corresponding cable station; and
(C) secondary circuit means for establishing an electrical fence between pairs of stations,
  (1) said secondary circuit means electrically connecting the low-voltage secondary of each transformer across a pair of electrodes, one at the corresponding cable station and the other at the cable station paired therewith.

2. The fence of claim 1 wherein:
(A) said secondary circuit means provides, between each one of said stations and its paired station, when said cable is submerged in fishing waters, an interstation circuit having
  (1) an electrical fence-forming water leg extending horizontally from said one station to said paired station and vertically from the bottom of said fishing waters upward to a predetermined extent.

3. The fence of claim 1 wherein:
(A) said secondary circuit means provides, between each one of said stations and its paired station, when said cable is submerged in fishing waters, an interstation circuit having
  (1) a solid conductive leg extending horizontally along the bottom of said fishing waters from said one station to its paired station and following a predetermined path which establishes the horizontal contour of the electrical fence.

4. The fence of claim 1 wherein:
(A) said secondary circuit means provides, between each pair of paired stations, when said cable is submerged in fishing waters, an interstation circuit having
  (1) a solid conductive leg extending horizontally along the bottom of said fishing waters from said one station to its paired station, said solid leg following a path of predetermined horizontal contour, and
  (2) an electrical fence-forming water leg extending horizontally along the bottom of said fishing waters from said one station to its paired station and vertically from the bottom upward to a predetermined extent, said water leg being of somewhat cylindrical cross-section centered on said solid leg so as to provide said fence with the horizontal contour of said solid leg.

References Cited
UNITED STATES PATENTS

| | | | |
|---|---|---|---|
| 2,146,105 | 2/1939 | Baker | 119—3 |
| 2,193,915 | 3/1940 | Baker | 119—3 |
| 2,709,984 | 6/1955 | Marks | 43—17.1 X |
| 2,778,140 | 1/1957 | Applegate et al. | 43—17.1 |
| 3,110,978 | 11/1963 | Kreutzer | 43—4.5 |

SAMUEL KOREN, *Primary Examiner.*

W. H. CAMP, *Assistant Examiner.*